Sept. 23, 1958     K. G. S. KRUTMEIJER     2,852,838
TOOL FOR MOUNTING ANTI-FRICTION BEARINGS
Filed June 13, 1955
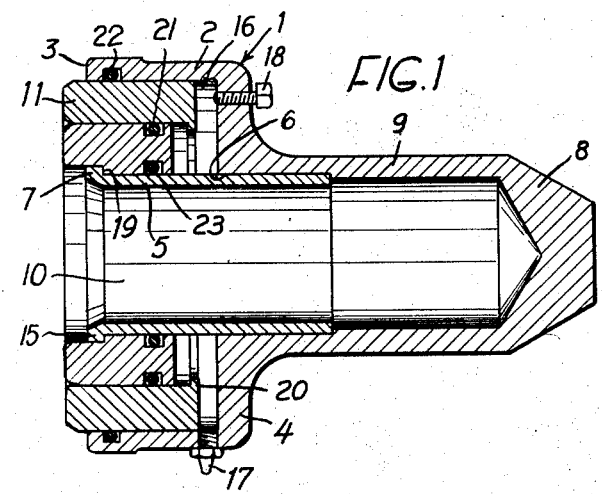
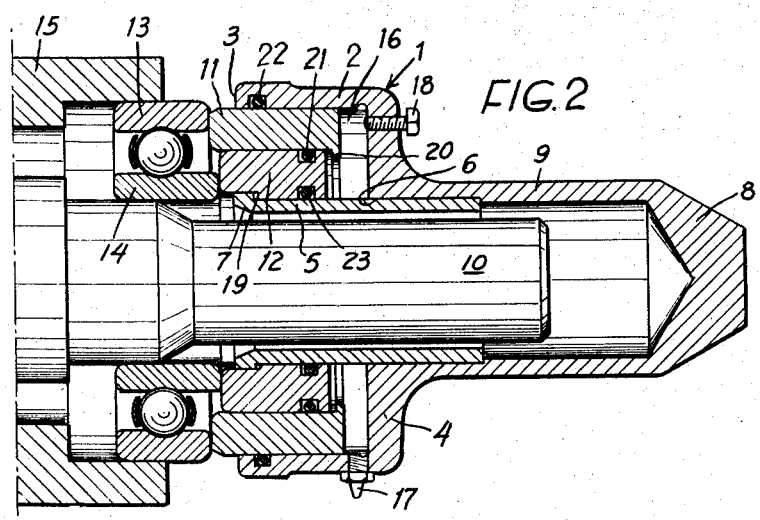
INVENTOR.
Karl Gunnar Sigfrid Krutmeijer
BY his Attorneys
Howson and Howson

2,852,838

TOOL FOR MOUNTING ANTI-FRICTION BEARINGS

Karl Gunnar Sigfrid Krutmeijer, Sodertalje, Sweden, assignor to Aktiebolaget Scania-Vabis, Sodertalje, Sweden, a corporation of Sweden Application June 13, 1955, Serial No. 515,149

Claims priority, application Sweden July 3, 1954

3 Claims. (Cl. 29—201)

This invention relates to a tool for mounting anti-friction bearings of the type including outer and inner races, the tool being adapted to drive the outer race and the inner race simultaneously into the bearing body and onto the bearing seat, respectively.

The conventional tool for mounting anti-friction bearings of the type specified has a plane annular end face which, when the bearing is driven into place, abuts both against the outer and the inner race, the purpose being to prevent the anti-friction members and the bearing faces of the races from being damaged by the forces required for driving the bearing home.

However, a condition for the reliability of this mounting method is that the end faces of the outer and inner races are located exactly in the same plane. If these end faces were not so located the driving force would be transmitted from the tool to one of the races only and part of the force would be transmitted via the anti-friction members to the other race.

On account of allowances in the manufacture, the end faces of the races are, however, not always lying in the same plane, and consequently the conditions for safe mounting of the bearing are not fulfilled.

The object of this invention is to eliminate the above named inconveniences coherent with the conventional plane-faced mounting tool.

This object is attained by mechanism illustrated in the annexed drawing in which Fig. 1 is a diagrammatic longitudinal section of a mounting tool made in accordance with the invention, and Fig. 2 is a similar sectional view showing the tool in position preparatory to mounting a bearing, the relative axial displacement of the pistons being shown at an exaggerated scale for the sake of clearness.

In the accompanying drawing wherein, for the purpose of illustration, there is shown a preferred embodiment of my present invention, the tool is designated broadly by the reference numeral 1, which tool includes a cup-shaped body member having an annular side wall 2 open at its outer end 3 and closed at its inner end by a base 4. A centrally-located member 5 is provided within said cup-shaped body member and extends outwardly from the center portion of the base 4 in parallel spaced relation to the annular side wall 2 and terminates at its outer end substantially in the plane of the outer open end 3 of annular side wall 2. As thus constructed, the annular side wall 2, base 4, and centrally-located member 5 define an annular chamber open at its outer end. In the preferred form of my present invention, the base 4 is provided with a centrally-located, relatively large opening 6 and the centrally-located member 5 is elongated, tubular form, the inner end of said member 5 being forced into said opening 6 with a tight fit, for a purpose to be hereinafter described. The outer end of said tubular member 5 is provided with an outwardly-extending annular flange 7 which, in a manner to be hereinafter described, functions as a stop flange.

That side of base 4 opposite to that from which said annular side wall 2 extends, is provided with an impact-receiving surface which, in the preferred form illustrated in the accompanying drawing, is located on the outer face of an end wall 8 at the outer end of a tubular extension 9 of substantial length which extends outwardly from said base. The bore of said tubular extension 9 is in axial alinement with the bore of the centrally-located member 5, said bores being of substantially equal diameters, and of diameters of sufficient extent to enable a shaft 10 to be passed therethrough during use of said tool when applying a bearing of the type specified at a position remote from the end of said shaft, all as clearly shown in Fig. 2 of the accompanying drawing.

Mounted within the annular chamber defined by annular side wall 2, base 4, and centrally-located member 5, is an outer annular piston 11 and an inner annular piston 12 of diameters corresponding substantially to the diameters of the outer race 13 and the inner race 14, respectively, of the anti-friction bearing which is to be mounted in the bearing body 15, all as clearly shown in the accompanying drawing, particularly in Fig. 2 thereof, from which it will be seen that said annular pistons 11 and 12 are concentrically arranged and independently slidable within said chamber with their inner ends disposed opposite said base 4 and spaced therefrom to provide a space 16 which is filled with a liquid introduced through nipple or fitting 17 and which space may be vented through air vent screw 18. The outer end portions of pistons 11 and 12 are adapted to extend outwardly beyond the open end of the annular chamber, i. e. outwardly beyond the outer end 3 of annular side wall 2. As a means for limiting outward movement of the pistons 11 and 12, the inner surface of annular piston 12 is undercut to provide an internal annular shoulder 19 adapted to engage the inner face of annular flange 7 on the outer end of member 5, and the inner surface of annular piston 11 is provided with a radial inwardly extending flange 20 adapted to engage the inner end face of inner annular piston 12. Pistons 11 and 12 are sealed against each other and against the annular side wall 2 and centrally-located member 5 in fluid-tight, sliding engagement by means of suitable packings 21, 22 and 23, respectively, suitable packing grooves being provided in the respective parts for reception of said packings.

When assembling the various parts of the tool above described, packing 22 is placed within the packing groove on the inner surface of annular side wall 2 and the outer annular piston 11 is inserted in the annular chamber. Packings 21 and 23 are inserted in the packing grooves on the outer and inner surfaces, respectively, of inner piston 12 and said inner piston is then mounted in the annular chamber. The member 5 is then partially driven into the central opening 6 in base 4 until the outer end of member 5 is substantially within the plane of the outer open end 3 of annular side wall 2. The inner ends of pistons 11 and 12 are positioned in spaced relation from the base 4 to provide the annular space 16 between said inner ends and base, which space is then filled with liquid introduced through nipple or fitting 17, air vent screw 18 being moved to open or venting position while liquid is being introduced into said space and being moved to closed or non-venting position when said space has been filled with liquid. When thus assembled, the tool is ready for use as a means for mounting in a bearing body an anti-friction bearing of the type specified.

During the operation of mounting a bearing in a bearing body 15 by the use of the tool described above, the bearing is placed in alinement with the bearing seat in said bearing body and the outer ends of pistons 11 and 12 are placed into contact with the outer ends of the inner and outer races 13 and 14, respectively, as shown in Fig. 2. Pressure is then applied to the impact-receiving surface on the outer face of end wall 8 of extension 9, the pressure applied to said impact-receiving surface being transmitted by the liquid in the space 16 to pistons 11 and 12 to force said pistons independently outwardly of the chamber and into pressure contact with the races 13 and 14, respectively, to force said races into the bearing seat in the bearing body 15. Engagement between the flange 7 and internal shoulder 19 and between flange 20 and the inner end of piston 12 prevents the pistons 11 and 12 from moving completely out of the annular chamber. When the tool is employed as a means for applying an anti-friction bearing of the type specified, at a position remote from the end of shaft 10, the end portion of said shaft is disposed within the axially-alined bores of the tubular member 5 and of the tubular extension 9, which tubular extension is sufficiently long to receive said shaft end.

During the mounting of a bearing between the bearing body 14 and a shaft 10, the outer piston 11, for instance, may be displaced relative to the inner piston 12, as shown in Fig. 2, the ratio of the forces acting upon the pistons and determined by the piston areas being, however, maintained constant.

The cross-sectional areas of the two annular pistons 11 and 12 should be correlated with each other in such a manner that the pressures acting on the pistons are proportional to the usual mounting resistances of the two bearing races.

As in the case of the conventional plane-faced tool of the prior art, the new tool can be operated by mechanical pressure applied against the impact-receiving surface on the outer face of end wall 8. It will be obvious that the hydraulic pressure in the annular space in back of the pistons can also be obtained with the use of oil under pressure.

The invention is not limited to the above described and illustrated form of construction which may be modified as to its details within the scope of the appended claims. A hydraulic transmission of the force exerted upon the tool is believed to be the most suitable.

What I claim is:

1. A tool for use in mounting in a bearing body an anti-friction bearing of the type including an outer race and an inner race to be driven simultaneously into a bearing body, said tool comprising a cup-shaped body member including an annular side wall open at its outer end and closed at its inner end by a base; a centrally-located member within said cup-shaped body member and extending outwardly from the central portion of said base in parallel spaced relation to said annular side wall and terminating at its outer end substantially in the plane of the outer open end of said annular side wall, said annular side wall, base and centrally-located member defining an annular chamber open at its outer end; an outer annular piston and an inner annular piston of diameters corresponding substantially to the diameters of the outer and inner races, respectively, of said anti-friction bearing, said pistons being concentrically arranged and independently slidable within said chamber with their inner ends disposed opposite said base and spaced therefrom, and having their outer ends adapted to extend outwardly beyond the open end of said annular chambers and into contact with the ends of said races; means for limiting outward movement of the inner ends of said pistons outwardly beyond the outer open end of said annular side wall; the space within said chamber between said base and the inner ends of said pistons being filled with liquid; and an impact-receiving surface on that side of said base which is opposite said annular side wall, pressure applied to said surface being transmitted by said liquid to said pistons to force said pistons into equalized pressure contact with the respective races to force the bearing into said bearing body.

2. A tool as defined in claim 1 wherein said base is provided with a centrally-located opening, and wherein said centrally-located member is tubular and is mounted within said opening, said opening and tubular member enabling a shaft to be passed therethrough during use of said tool when applying a bearing of the type specified at a position remote from the end of the shaft.

3. A tool as defined in claim 2 wherein said body member includes a tubular extension of substantial length extending outwardly from said base on that side thereof which is opposite said annular side wall, said tubular extension being closed at its outer end by a wall the outer face of which constitutes said impact-receiving surface, the bore of said tubular extension being in axial alinement with the bore of said tubular centrally-located member, said tubular member and tubular extension enabling a shaft to be passed through said alined bores during use of said tool when applying a bearing of the type specified at a position remote from the end of the shaft.

References Cited in the file of this patent

UNITED STATES PATENTS

| | | |
|---|---|---|
| 1,967,245 | Hothersall | July 24, 1934 |
| 2,441,981 | Stelzer | May 25, 1948 |